United States Patent
Sakamoto et al.

(10) Patent No.: US 10,005,493 B2
(45) Date of Patent: Jun. 26, 2018

(54) VEHICLE TRAVELING CONTROL APPARATUS

(71) Applicant: SUBARU CORPORATION, Tokyo (JP)

(72) Inventors: Kensei Sakamoto, Tokyo (JP); Takashi Kubo, Tokyo (JP); Hideaki Suzuki, Tokyo (JP); Masayuki Yajima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 49 days.

(21) Appl. No.: 15/369,229

(22) Filed: Dec. 5, 2016

(65) Prior Publication Data

US 2017/0158237 A1 Jun. 8, 2017

(30) Foreign Application Priority Data

Dec. 7, 2015 (JP) ................................. 2015-238721

(51) Int. Cl.
| | | |
|---|---|---|
| *B62D 15/02* | (2006.01) | |
| *G05D 1/02* | (2006.01) | |
| *B60W 30/165* | (2012.01) | |
| *B60W 30/10* | (2006.01) | |

(52) U.S. Cl.
CPC ........... *B62D 15/026* (2013.01); *B60W 30/10* (2013.01); *B60W 30/165* (2013.01); *G05D 1/0246* (2013.01); *G05D 1/0291* (2013.01); *B60W 2550/304* (2013.01); *B60W 2550/306* (2013.01); *G05D 2201/0213* (2013.01)

(58) Field of Classification Search
CPC ... B62D 15/026; B60W 30/165; B60W 30/10; B60W 2550/304; B60W 2550/306; G05D 1/0291; G05D 2201/0213
See application file for complete search history.

(56) References Cited

U.S. PATENT DOCUMENTS

| | | | | |
|---|---|---|---|---|
| 9,020,680 | B2 * | 4/2015 | Solyom | G05D 1/0293 |
| | | | | 701/23 |
| 9,881,498 | B2 * | 1/2018 | Paromtchik | G08G 1/0137 |
| 2010/0324797 | A1 * | 12/2010 | Fritz | B60W 10/06 |
| | | | | 701/96 |
| 2016/0200321 | A1 | 7/2016 | Yamada et al. | |

FOREIGN PATENT DOCUMENTS

| | | |
|---|---|---|
| JP | 2000-020896 A | 1/2000 |
| JP | 2004-322916 A | 11/2004 |
| JP | 2015-051717 A | 3/2015 |

OTHER PUBLICATIONS

Office Action issued in corresponding Japanese Patent Application No. 2015-238721, dated Oct. 3, 2017.

* cited by examiner

*Primary Examiner* — Todd Melton
(74) *Attorney, Agent, or Firm* — McDermott Will & Emery LLP

(57) ABSTRACT

A vehicle traveling control apparatus includes a setting unit and a adjusting unit. The setting unit sets a set position of a preceding vehicle ahead of an own vehicle in a vehicle width direction as a control target point of follow-up traveling allowing for traveling while following the preceding vehicle. The control amount adjusting unit adjusts, on a basis of a first control adjustment value that is based on shape data of the preceding vehicle, a control amount that controls the own vehicle to the control target point.

6 Claims, 5 Drawing Sheets

VEHICLE TRAVELING CONTROL APPARATUS

CROSS-REFERENCE TO RELATED APPLICATIONS

The present application claims priority from Japanese Patent Application No. 2015-238721 filed on Dec. 7, 2015, the entire contents of which are hereby incorporated by reference.

BACKGROUND

The technology relates to a vehicle traveling control apparatus that controls follow-up traveling allowing for traveling while following a preceding vehicle ahead of an own vehicle.

In recent years, in vehicles such as automobiles, a follow-up traveling system has been known in which an own vehicle travels while following a preceding vehicle traveling ahead of the own vehicle. As disclosed in Japanese Unexamined Patent Application Publication No. 2004-322916, the follow-up traveling system to follow a preceding vehicle automatically controls a steering wheel, a transmission, an engine, and a brake by capturing the preceding vehicle with a radar or a camera, for example. The follow-up traveling system is effective in a case of traveling a road without a lane marker or a white line on a surface of the road. The follow-up traveling system is effective as well in a case where, during low-speed traveling in traffic jam or in other situations, an inter-vehicle distance between the own vehicle and the preceding vehicle decreases to limit the front visual field, which makes it difficult to recognize a lane line such as a white line.

SUMMARY

The above-mentioned follow-up traveling system typically adopts, as a control target point, a center position of a preceding vehicle in the vehicle width direction, and controls such that a center position of an own vehicle in the width direction coincides with the control target point. The center position of the preceding vehicle may be calculated by observing the rear region of the preceding vehicle.

When the preceding vehicle to be followed is a vehicle smaller than the own vehicle, however, the smaller vehicle is more likely to be affected by disturbance due to factors such as vehicle weight and gravity center. Thus, it is probable that a lateral position of the vehicle may be varied at a high frequency and high amplitude.

Accordingly, when the own vehicle travels while following a vehicle smaller than the own vehicle, the own vehicle tends to wobble in its behavior more easily than a case of traveling while following a larger vehicle, which may end up in giving a sense of anxiety to a driver of the own vehicle or drivers of surrounding vehicles.

It is desirable to provide a vehicle traveling control apparatus that suppresses wobbling of an own vehicle, during traveling while following a preceding vehicle despite wobbling in a traveling locus of the preceding vehicle.

An aspect of the technology provides a vehicle traveling control apparatus including a setting unit that sets a set position of a preceding vehicle ahead of an own vehicle in a vehicle width direction as a control target point of follow-up traveling allowing for traveling while following the preceding vehicle, and a adjusting unit that adjusts, on a basis of a first control adjustment value that is based on shape data of the preceding vehicle, a control amount that controls the own vehicle to the control target point.

DETAILED DESCRIPTION

Figure 1:
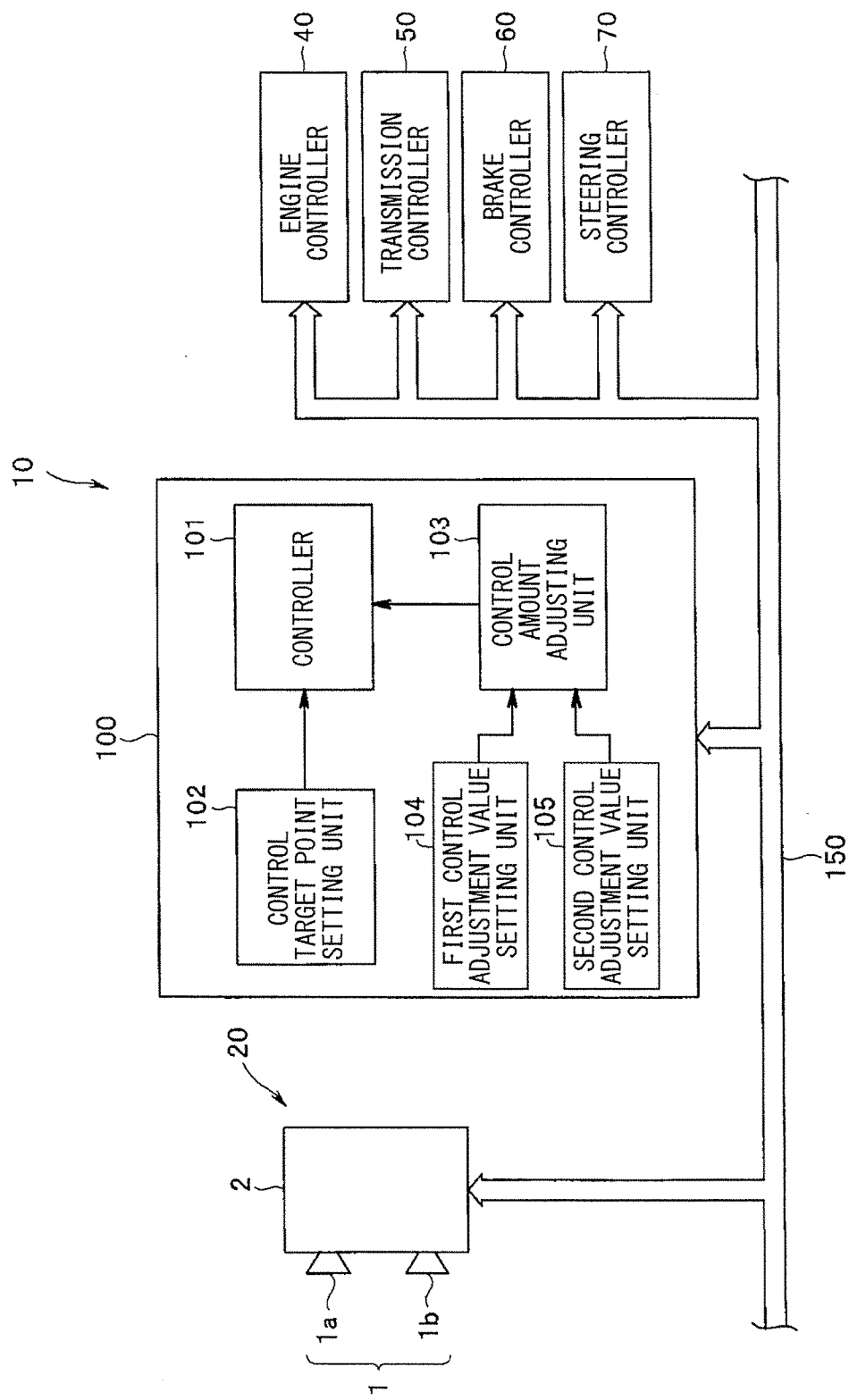
FIG. 1 is a configuration diagram of a traveling control system.

In the following, some implementations of the technology are described with reference to the accompanying drawings. A traveling control system 10 illustrated in FIG. 1 may be directed to a vehicle such as an automobile. The traveling control system 10 may perform traveling control including vehicle autonomous automatic driving. The traveling control system 10 may include, for example, a traveling controller 100 as a center unit, an outside environment recognizer 20, an engine controller 40, a transmission controller 50, a brake controller 60, and a steering controller 70, which may be coupled with one another via a communication bus 150 that forms an intra-vehicle network.

The outside environment recognizer 20 may recognize an outside environment around an own vehicle using various devices such as, but not limited to, an on-vehicle camera, a millimeter-wave radar, and a laser radar. In an implementation of the technology, as the outside environment recognizer 20, an on-vehicle camera 1 and an image recognizer 2 are adopted to mainly describe recognition of the outside environment by the on-vehicle camera 1 and the image recognizer 2.

In an implementation of the technology, the camera 1 may be a stereo camera including two cameras 1a and 1b that capture images of the same object from different points of view. The cameras 1a and 1b may be shutter-synchronized cameras each including an imaging device such as a charge-coupled device (CCD) and a complementary metal oxide semiconductor (CMOS). The cameras 1a and 1b may be disposed with a predetermined base line length in vicinity of a rear-view mirror on inner side of a windshield, in an upper part of vehicle interior, for example.

A pair of right and left images captured by the camera 1 may be processed by the image recognizer 2. The image recognizer 2 may determine a pixel offset amount (parallax) between the right and left images at a corresponding position by a stereo matching processing, and may convert the pixel offset amount into data such as luminance data to generate a distance image. A point on the distance image may be coordinate-transformed, on principle of triangulation, to a point in a real space having an X-axis as a vehicle width direction, i.e., a right-left direction of the own vehicle; a Y-axis as a vehicle height direction; and a Z-axis as a vehicle length direction, i.e., a distance direction. Thus, a lane line such as a white line on a road on which the own vehicle is traveling, an obstacle, a vehicle traveling ahead of the own vehicle, or other objects may be three-dimensionally recognized.

The white line as an example of a lane line is recognizable by extracting, from the image, a group of points that may be a proposed white line, and calculating a straight line or a curve that connects the proposed points. For example, in a white line detection region set on the image, an edge may be detected whose luminance is varied by a predetermined value or more on a plurality of search lines set in a horizontal direction (vehicle width direction) to detect a set of a white line start point and a white line end point for each search line. Thus, a middle region between the white line start point and the white line end point may be extracted as a proposed white line point.

Thereafter, time-series data of a spatial coordinate position of the proposed white line point may be obtained on the basis of the vehicle movement amount per unit time. The obtained time-series data may be processed to calculate a model approximate to the right white line and the left white line. This calculated model allows the white line to be recognized. As the approximate model of the white line, an approximate model of coupled linear components determined by Hough transform, an approximate model of a curve such as a quadratic, or any other suitable approximate model may be used.

The engine controller 40 may control the driving state of an unillustrated engine on the basis of signals from various sensors that detect an engine driving state and various control information transmitted via the communication bus 150. The engine controller 40 may perform engine control on the basis of, for example but not limited to, intake air volume, throttle opening angle, engine water temperature, intake air temperature, air-fuel ratio, crank angle, accelerator position, and other vehicle information. Non-limiting examples of the principal engine control may include fuel injection control, ignition timing control, and control of the opening angle of an electronically-controlled throttle valve.

The transmission controller 50 may control oil pressure to be supplied to an unillustrated automatic transmission on the basis of signals from sensors that detect a transmission position and a vehicle velocity, for example, or on the basis of various pieces of control information transmitted via the communication bus 150. Thus, the transmission controller 50 may control the automatic transmission in accordance with preset transmission characteristics.

The brake controller 60 may control unillustrated brake devices of four wheels independently of a braking operation performed by a driver, on the basis of, for example but not limited to, a brake switch, wheel speed of each of the four wheels, a steering angle, a yaw rate, and other vehicle information. The brake controller 60 may also perform, for example, an antilock brake system and an antiskid control by calculating braking fluid pressure to be applied to each wheel on the basis of brake force of each wheel.

The steering controller 70 may control assist torque derived from an unillustrated electric power steering motor provided in a steering system of the vehicle, on the basis of, for example but not limited to, the vehicle velocity, the steering torque based on an input received from a driver, the steering angle, the yaw rate, and other vehicle information. The steering controller 70 may also perform, in accordance with an instruction from the traveling controller 100, driving control of the electric power steering motor with a steering amount that allows for following a traveling locus of a preceding vehicle, during follow-up traveling to follow the preceding vehicle traveling ahead of the own vehicle.

Next, description is given of the traveling controller 100 as a central unit of the traveling control system 10. The traveling controller 100 may perform traveling control of the own vehicle to an advancing route along the traveling lane, and follow-up traveling control that allows for traveling while following the preceding vehicle, on the basis of recognition results of the outside environments obtained by the outside environment recognizer 20. The traveling controls may be performed on the basis of, as main units, a controller 101 and a control target point setting unit 102 of the traveling controller 100.

When no preceding vehicle ahead of the own vehicle is captured, the controller 101 may recognize a lane line such as a white line on a road to detect a traveling lane of the own vehicle, and may set an advancing route along the traveling lane. Thereafter, the controller 101 may perform traveling control by means of the engine controller 40, the transmission controller 50, the brake controller 60, and the steering controller 70 so as to allow for traveling at a set vehicle velocity on the advancing route.

When the preceding vehicle ahead of the own vehicle has been captured, the controller 101 may perform the traveling control by means of the engine controller 40, the transmission controller 50, the brake controller 60, and the steering controller 70 so as to allow for traveling at a set vehicle velocity on the advancing route while keeping a predetermined inter-vehicle distance between the own vehicle and the preceding vehicle. The controller 101 may also perform follow-up traveling control that allows for traveling while following the preceding vehicle during low-speed traveling in traffic jam or in other situations.

In the follow-up traveling to follow the preceding vehicle, the controller 101 may calculate the traveling locus of the preceding vehicle, and may perform steering control by means of the steering controller 70 to bring the own vehicle into coincidence with the traveling locus. The controller 101 may also perform travel drive control by means of the engine controller 40, the transmission controller 50, and the brake controller 60. In this case, the follow-up traveling control to follow the preceding vehicle may serve as a control that determines an advancing direction of the own vehicle by correcting a steering angle to allow the lateral position of the own vehicle within lane lines to coincide with a control target point set by the control target point setting unit 102.

The control target point may be set at a center position of a rear region of the preceding vehicle in the vehicle width direction, and the center position may be adopted as a position of the preceding vehicle to calculate the traveling locus. More specifically, for example, the center position of the rear region of the preceding vehicle may be determined from captured images of the camera 1, and the center position may be adopted as a proposed point indicating the position of the preceding vehicle to determine a proposed point for each frame on the basis of a movement amount of the own vehicle per frame in the captured images. Thereafter, a curve that approximates to a group of the proposed points may be calculated as the traveling locus of the preceding vehicle.

Figure 2:
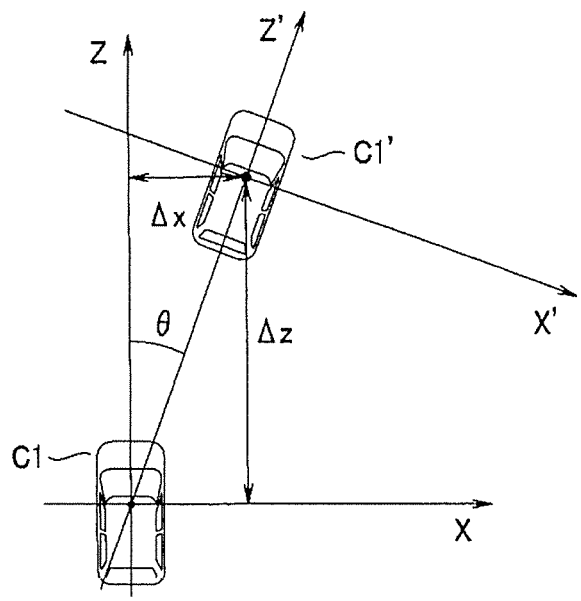
FIG. 2 is an explanatory diagram of a vehicle movement amount.

More particularly, from a relationship illustrated in FIG. 2, on the basis of vehicle velocity V of an own vehicle C1 and a yaw angle θ determined by the yaw rate of the own vehicle C1, movement amounts Δx and Δz to an own vehicle C1' at a frame rate Δt (period of time until a captured image is updated by one frame) may be calculated using the following expressions (1) and (2).

$$\Delta x = V \cdot \Delta t \cdot \sin \theta \qquad (1)$$

$$\Delta z = V \cdot \Delta t \cdot \cos \theta \quad (2)$$

Thereafter, the movement amounts Δx and Δz of the own vehicle may be subtracted from proposed points Pold (Xold, Zold), which are detected prior to previous frame, of the preceding vehicle, and coordinate transformation to a vehicle fixed coordinate system (X', Z') in a current frame may be performed to calculate coordinates of proposed points Ppre (Xpre, Zpre) of the preceding vehicle in the current frame, as represented by the following expressions (3) and (4).

$$X\text{pre} = (X\text{old} - \Delta x) \cdot \cos \theta - (Z\text{old} - \Delta z) \cdot \sin \theta \quad (3)$$

$$Z\text{pre} = (Z\text{old} - \Delta x) \cdot \sin \theta + (Z\text{old} - \Delta z) \cdot \cos \theta \quad (4)$$

For example, least-square method may be applied to the group of proposed points to determine a curve as represented by the following expression (5).

$$P = K1 \cdot Z^2 + K2 \cdot Z + K3 \quad (5)$$

Figure 3:
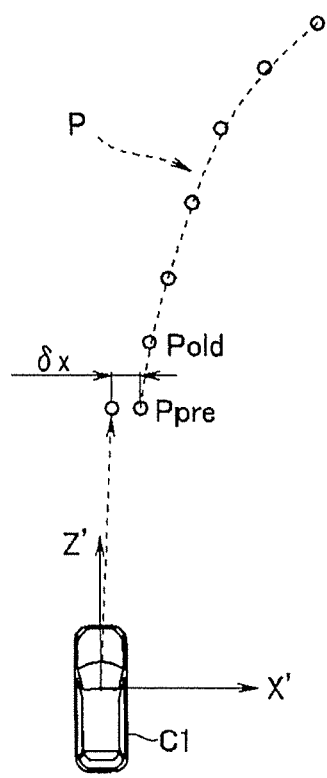
FIG. 3 is an explanatory diagram illustrating a traveling locus of a preceding vehicle.

The curve may be defined as a traveling locus P of the preceding vehicle as illustrated in FIG. 3. In the expression (5), a coefficient K1 denotes a curvature component of the traveling locus; a coefficient K2 denotes a yaw angle component of the traveling locus (a slope component of the traveling locus with respect to the own vehicle); and a coefficient K3 denotes a lateral position component of the traveling locus with respect to the own vehicle.

As described above, the follow-up control to follow the traveling locus of the preceding vehicle may adopt, as the control target point, the center position of the rear region of the preceding vehicle in the vehicle width direction to control the steering angle of the own vehicle. Accordingly, the controller 101 may correct the current steering angle by means of the steering controller 70 so as to allow the center position of the own vehicle in the vehicle width direction to coincide with the control target point, thereby controlling the follow-up traveling to follow the preceding vehicle. The steering control for the control target point may be performed mainly using a feedback control based on deviation δx between the control target point and the position of the own vehicle when advancing at the current steering angle.

For example, a feedforward steering amount based on the curvature K1 of the traveling locus of the preceding vehicle, and a feedback steering amount of deviation δyaw for allowing the yaw angle of the own vehicle to coincide with the yaw angle component K2 of the traveling locus may be added to a steering amount based on the deviation δx with respect to the control target point to allow for calculation of a target steering angle αref, as represented by the following expression (6):

$$\alpha\text{ref} = Gf \cdot \delta x + Gff \cdot K1 + Gy \cdot \delta \text{yaw} \quad (6)$$

where

Gf denotes a feedback gain for the deviation between the control target point and the position of the own vehicle when advancing at the current steering angle, Gff denotes a feedforward gain for the curvature of the traveling locus, and Gy denotes a feedback gain for a relative yaw angle between the traveling locus and the own vehicle.

The steering control for the target steering angle αref may be performed as a control for target steering torque based on the deviation between the target steering angle αref and an actual steering angle αt. The control for the target steering torque may be performed specifically as an electric current control of the electric power steering motor. For example, the electric power steering motor may be driven by a drive current Im under proportional-integral-derivative (PID) control, as represented by the following expression (7):

$$Im = Kv \cdot (Gp \cdot (\alpha\text{ref} - \alpha t) + Gi \cdot \int (\alpha\text{ref} - \alpha t) dt + Gd \cdot d(\alpha\text{ref} - \alpha t)/dt) \quad (7)$$

where

Kv denotes motor-voltage-to-current conversion factor,

Gp denotes a proportional gain,

Gi denotes an integral gain, and

Gd denotes a derivative gain.

Figure 4:
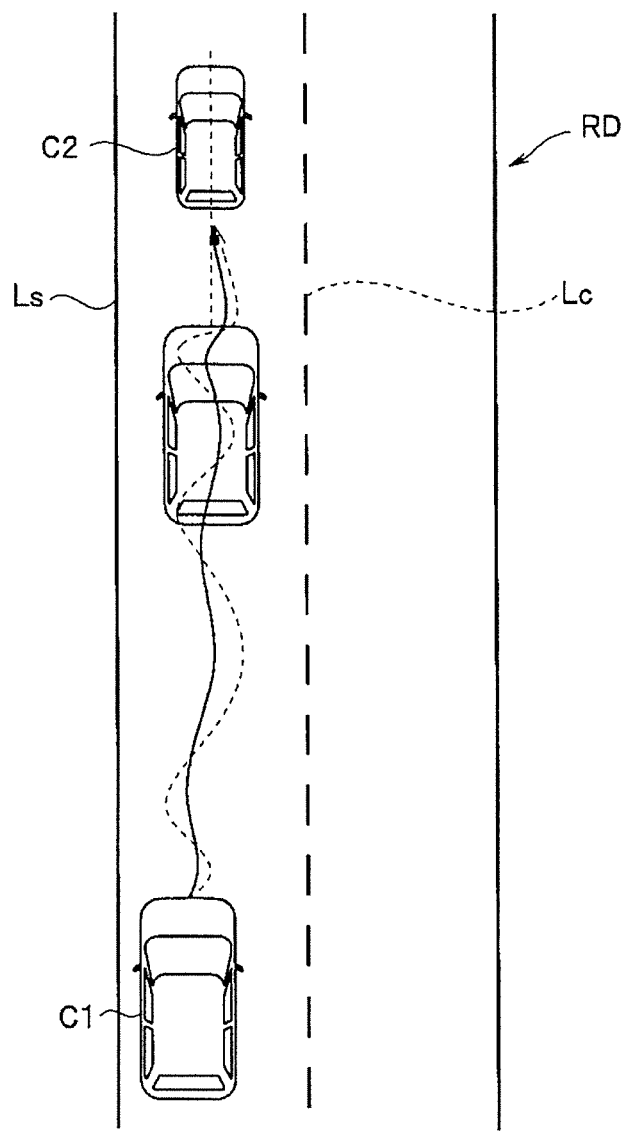
FIG. 4 is an explanatory diagram illustrating a follow-up locus relative to the preceding vehicle.

As illustrated in a broken line in FIG. 4, in such a follow-up traveling to follow the preceding vehicle, when a preceding vehicle C2 advances in a wobbling manner between lane lines Ls and Lc of a road RD, the own vehicle C1 following the preceding vehicle C2 may also wobble, which may end up in giving a sense of anxiety to a driver. In particular, when the preceding vehicle C2 is a vehicle smaller than the own vehicle C1, the preceding vehicle C2 is more likely to be affected by disturbance due to factors such as vehicle weight and gravity center, causing the lateral position of the vehicle to be varied at a high frequency and high amplitude.

To address such wobbling in the traveling locus of the preceding vehicle, as illustrated in FIG. 1, the traveling controller 100 may include, in addition to the controller 101 and the control target point setting unit 102, a control amount adjusting unit 103, a first control adjustment value setting unit 104, and a second control adjustment value setting unit 105, thus suppressing the wobbling of the own vehicle by adjusting the follow-up property to follow the preceding vehicle.

The control amount adjusting unit 103 may increase and decrease the control amount of the follow-up traveling control performed in the controller 101 to adjust the follow-up property to follow the preceding vehicle. The increase and decrease in the control amount may involve adjustment of the steering angle and the steering force of the own vehicle during the follow-up traveling. The control amount adjusting unit 103, for example, may increase and decrease the target steering angle αref according to the expression (6), or may increase and decrease the drive current Im for the electric power steering motor according to the expression (7).

More specifically, the feedback gain Gf for the deviation between the control target point and the position of the own vehicle in the target steering angle αref may be mainly adjusted. Further, gains such as feedback gain Gy for the relative yaw angle between the traveling locus and the own vehicle, and the control gain including a proportional gain Gp, an integral gain Gi, and a derivative gain Gd in the PID control for the target steering torque may also be adjusted on an as-needed basis.

In an implementation of the technology, a first gain G1 based on the shape data of the preceding vehicle and a second gain G2 based on the lateral velocity (moving velocity in the X-axis direction) of the preceding vehicle may be set as the control adjustment value for the control amount of the follow-up traveling. The first gain G1 may be set in the first control adjustment value setting unit 104, and the second gain G2 may be set in the second control adjustment value setting unit 105. The control amount adjusting unit 103 may mainly use the first gain G1 to adjust the control amount of the follow-up traveling, and may selectively use the second gain G2 depending on circumstances to adjust the control amount of the follow-up traveling.

In an implementation of the technology, the first gain G1 may be set on the basis of a relationship between the shape data of the preceding vehicle obtained from the captured images of the camera 1 and corresponding shape data of the own vehicle stored in advance in a device of the own vehicle. As the relationship of shape data between the preceding vehicle and the own vehicle, ratios such as vehicle width ratio, area ratio (ratio between areas projected onto a plane where the vehicle width direction is the X-axis and the vehicle height direction is the Y-axis), and aspect ratio (vehicle height/vehicle width) may be used.

In an implementation of the technology, the vehicle width ratio between the preceding vehicle and the own vehicle may be used as the ratio of the shape data between the preceding vehicle and the own vehicle. The first control adjustment value setting unit 104 may calculate, as a vehicle width W2, a difference between a rightmost position and a leftmost position of the rear region of the preceding vehicle in the X-axis direction obtained from the captured images of the camera 1. Thus, the first control adjustment value setting unit 104 may set the first gain G1 on the basis of the vehicle width ratio (W2/W1) of the vehicle width W2 to a vehicle width W1 of the own vehicle. The vehicle width W1 may be already known in advance.

Figure 5:
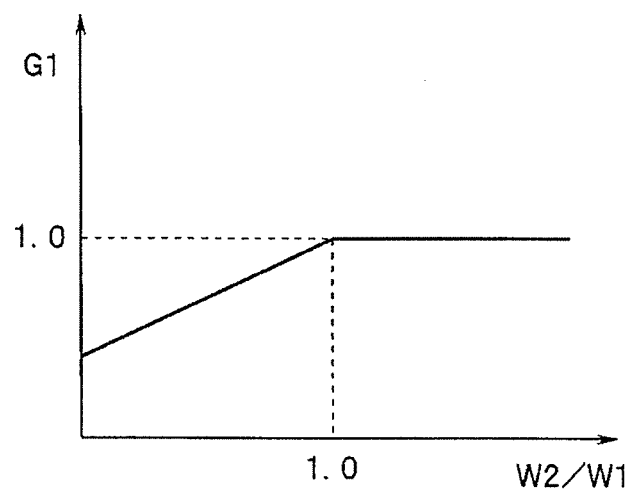
FIG. 5 is an explanatory diagram of characteristics of a first gain.

The first gain G1 may be set taking account of the wobbling tendency in vehicle behavior in a case where the preceding vehicle is a smaller vehicle having a vehicle width smaller than the vehicle width of the own vehicle. The first gain G1 may be stored in a property table as illustrated in FIG. 5, for example, and may be set with reference to the table. In FIG. 5, in a case where the vehicle width ratio is less than 1.0 (W2/W1<1.0), as the vehicle width ratio W2/W1 decreases, the first gain G1 may also decrease. In a case where the vehicle width ratio is equal to or greater than 1.0 (W2/W1≥1.0), the first gain G1 may be set to have a property of G1=1.0 (without adjustment).

It is to be noted that while, in the table of FIG. 5, the first gain G1 is set on the basis of the vehicle width ratio W2/W1, the first gain G1 may also be set on the basis of the vehicle width W2 of the preceding vehicle. In other words, the vehicle width of the own vehicle is already known, and thus detection of the vehicle width of the preceding vehicle makes it clear as to whether or not the preceding vehicle is smaller than the own vehicle and tends to wobble in its vehicle behavior. Therefore, the first gain G1 may also be set unequivocally from the shape data of the preceding vehicle.

In contrast, the second gain G2 may be an adjustment value taking account of an assumption that the preceding vehicle may travel along a curve when the lateral moving velocity of the preceding vehicle is increased. The second control adjustment value setting unit 105 may calculate lateral velocity Vx of the preceding vehicle from the captured images of the camera 1, and set the second gain G2 on the basis of the lateral velocity Vx.

Figure 6:
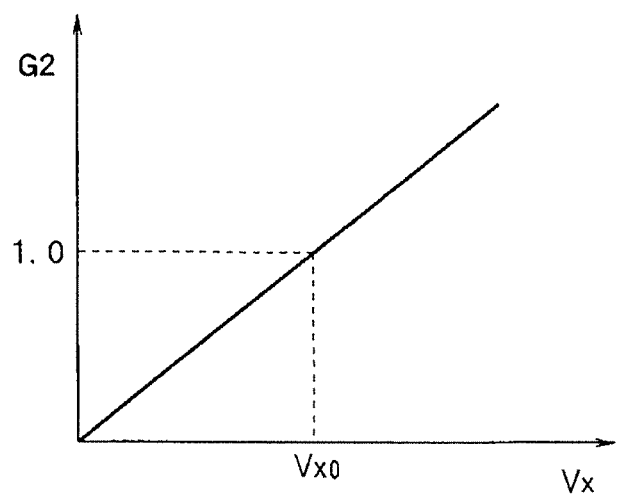
FIG. 6 is an explanatory diagram of characteristics of a second gain.

The second gain G2 may be stored in a property table as illustrated in FIG. 6, for example, and may be set with reference to the table. In FIG. 6, the second gain G2 may be set to have a property in which the second gain G2 is varied substantially linearly relative to the lateral velocity Vx of the preceding vehicle, such that the second gain G2 is equal to 1.0 (G2=1.0) at reference velocity $Vx_0$ at which traveling along a curve is assumed.

In an implementation of the technology, the first gain G1 based on the vehicle width ratio between the preceding vehicle and the own vehicle and the second gain G2 based on the lateral velocity of the preceding vehicle may be set such that the first gain G1 is less than the second gain G2 (G1<G2) in a region defined by $Vx>Vx_0$. In other words, when the lateral velocity Vx of the preceding vehicle exceeds the reference velocity, an adjustment may be made to enhance the follow-up property in accordance with the lateral velocity of the preceding vehicle irrespective of the vehicle width of the preceding vehicle, thereby preventing the lowering of the follow-up property to follow the preceding vehicle during traveling along a curve.

Figure 7:
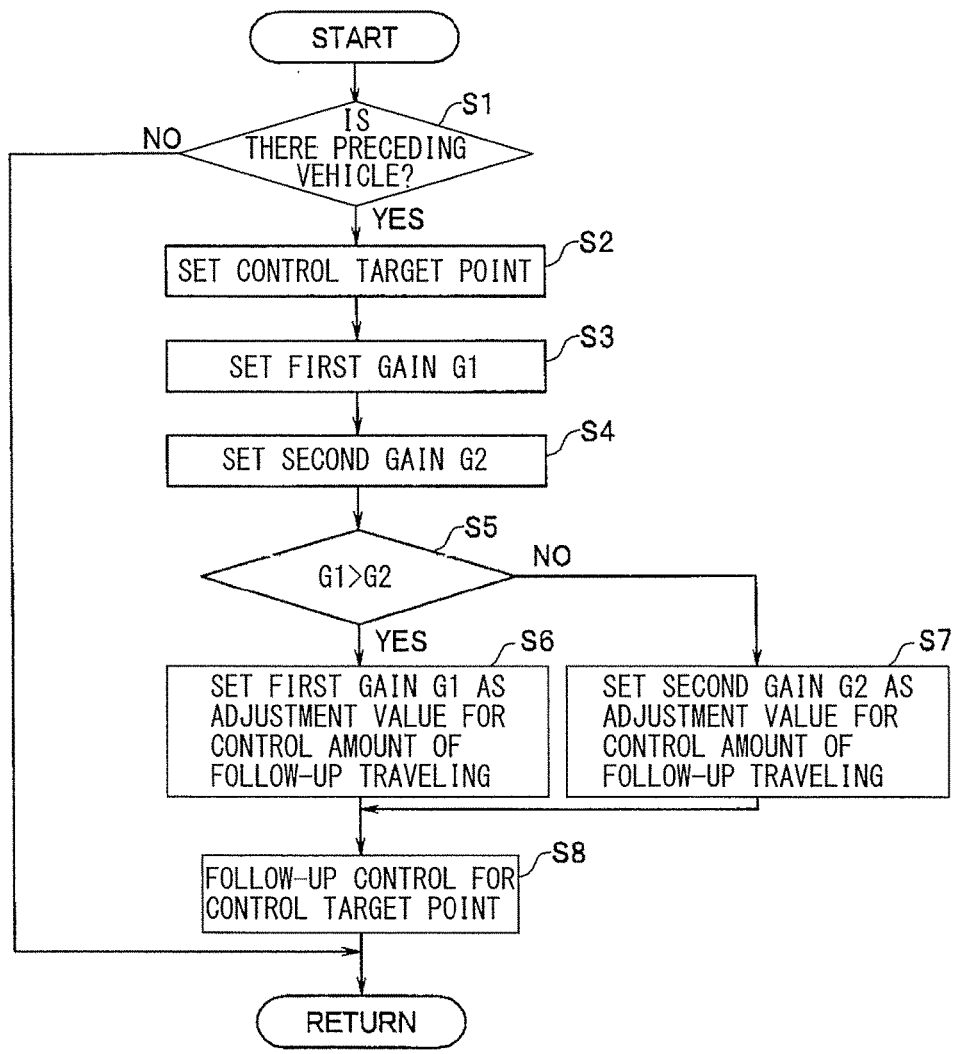
FIG. 7 is a flowchart of a follow-up traveling control.

Next, description is given, with reference to the flowchart of FIG. 7, of program processing of the follow-up traveling control to follow the preceding vehicle performed in the traveling controller 100.

In the follow-up traveling control to follow the preceding vehicle, in first step S1, checking may be made as to whether or not there is a preceding vehicle recognized in a predetermined range ahead of the own vehicle. Thereafter, when no preceding vehicle is recognized, the flow may skip this processing. When, the preceding vehicle is recognized, the flow may proceed from step S1 to step S2, in which the center position of the rear region of the preceding vehicle may be set as the control target point of the follow-up traveling to follow the preceding vehicle.

Next, the flow may proceed to step S3, in which the vehicle width W2 of the preceding vehicle may be calculated to set the first gain G1. For example, the first gain G1 may be set by referring to the table based on the vehicle width ratio W2/W1 of the vehicle width W2 of the preceding vehicle to the vehicle width W1 of the own vehicle which is stored in advance in a device (see FIG. 5). Further, in step S4, the lateral velocity Vx of the preceding vehicle may be calculated to set the second gain G2 by, for example, referring to the table based on the lateral velocity Vx (see FIG. 6).

In step S5 after step S4, the first gain G1 may be compared with the second gain G2. When the first gain G1 is greater than the second gain G2 (G1>G2), in step S6, the first gain G1 based on the vehicle width ratio between the preceding vehicle and the own vehicle may be set as the adjustment value for the control amount of the follow-up traveling. When the first gain G1 is equal to or less than the second gain G2 (G1≤G2), in step S7, the second gain G2 based on the lateral velocity of the preceding vehicle may be set as the adjustment value for the control amount of the follow-up traveling.

Thereafter, step S6 or step S7 may proceed to step S8 to perform the follow-up traveling control so as to allow the center position of the own vehicle in the vehicle width direction to coincide with the control target point. The follow-up traveling control may be performed mainly using a steering control that corrects the current steering angle on the basis of the deviation between the control target point and the center position of the own vehicle. When the preceding vehicle C2 is a vehicle smaller than the own vehicle C1 and tends to wobble in its traveling locus as illustrated in FIG. 4, the follow-up property of the own vehicle may be lowered to have a traveling locus as illustrated in a solid line in FIG. 4, thereby suppressing the wobbling and thus eliminating a sense of anxiety of a driver.

As described above, in an implementation of the technology, it is possible to suppress wobbling of the own vehicle despite wobbling in the traveling locus of the preceding vehicle without giving a sense of anxiety to a driver of the own vehicle and drivers of surrounding vehicles, even when the preceding vehicle is a vehicle smaller than the own vehicle and tends to wobble, during the follow-up traveling using the set position of the preceding vehicle in the vehicle width direction as the control target point.

According to an implementation of the disclosure, it is possible to suppress wobbling of an own vehicle, during traveling while following a preceding vehicle, despite wobbling in a traveling locus of the preceding vehicle.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus comprising:
a setting unit that sets a set position of a preceding vehicle ahead of an own vehicle in a vehicle width direction as a control target point of follow-up traveling allowing for traveling while following the preceding vehicle; and
a adjusting unit that adjusts, on a basis of a first control adjustment value that is based on shape data of the preceding vehicle, a control amount that controls the own vehicle to the control target point.

2. The vehicle traveling control apparatus according to claim 1, wherein, when a second control adjustment value based on lateral velocity of the preceding vehicle exceeds the first control adjustment value, the adjusting unit adjusts, on a basis of the second control adjustment value, the control amount that controls the own vehicle to the control target point.

3. The vehicle traveling control apparatus according to claim 2, wherein the control adjustment value comprises an adjustment value of a steering amount of the own vehicle that steers the own vehicle to the control target point.

4. The vehicle traveling control apparatus according to claim 2, wherein the control adjustment value comprises an adjustment value of steering force of the own vehicle that steers the own vehicle to the control target point.

5. The vehicle traveling control apparatus according to claim 1, wherein the control adjustment value comprises an adjustment value of a steering amount of the own vehicle that steers the own vehicle to the control target point.

6. The vehicle traveling control apparatus according to claim 1, wherein the control adjustment value comprises an adjustment value of steering force of the own vehicle that steers the own vehicle to the control target point.

* * * * *